United States Patent [19]

Shigaki

[11] Patent Number: 5,227,823

[45] Date of Patent: Jul. 13, 1993

[54] PHOTOFINISHING METHOD UTILIZG340104ORDED DATA FOR A PRINTING OPERATION

[75] Inventor: Takao Shigaki, Kanagawa, Japan

[73] Assignee: Fuji Photo Film Co., Ltd., Kanagawa, Japan

[21] Appl. No.: 643,239

[22] Filed: Jan. 18, 1991

[30] Foreign Application Priority Data

Jan. 19, 1990 [JP] Japan ................................. 2-9518

[51] Int. Cl.$^5$ .................... G03B 17/24; G03B 27/52
[52] U.S. Cl. .................................. 354/106; 355/77; 355/133
[58] Field of Search .............. 355/27, 38, 40, 41, 355/68, 77, 133; 354/105, 106

[56] References Cited

U.S. PATENT DOCUMENTS 5,093,686  3/1992  Shigaki ............................. 355/77

FOREIGN PATENT DOCUMENTS

| | | |
|---|---|---|
| 49-74019 | 7/1974 | Japan . |
| 50-30517 | 3/1975 | Japan . |
| 51-117632 | 10/1976 | Japan . |
| 52-30429 | 3/1977 | Japan . |
| 54-2115 | 1/1979 | Japan . |
| 55-101932 | 8/1980 | Japan . |
| 63-201645 | 8/1988 | Japan . |
| 63-188644 | 12/1988 | Japan . |
| 63-298233 | 12/1988 | Japan . |
| 64-6933 | 1/1989 | Japan . |
| 64-21432 | 1/1989 | Japan . |

Primary Examiner—Michael L. Gellner
Assistant Examiner—J. K. Han
Attorney, Agent, or Firm—Sughrue, Mion, Zinn, Macpeak & Seas

[57] ABSTRACT

A first film cassette for containing a photographic filmstrip has a first data recording portion formed thereon. Data as to the recording of a plurality of image frames are recorded on the first data recording portion when exposing the filmstrip. The filmstrip is separated from the first film cassette before development. The filmstrip is subjected to a motion-picture-film type developing process constituted by splicing, development and separation of a plurality of filmstrips. The separated filmstrip is wound up in a second film cassette, and thus is preserved in a convenient state. The image recording data stored in the first data recording portion are transferred to a second data recording portion formed on the second film cassette, and are utilized in a printing operation. In a preferred embodiment, the filmstrip has a data recording area formed thereon. The image recording data stored in the data recording area are transferred to a preservative film cassette on a data recording portion. The transferred data are related to information common to all the image frames of the filmstrip.

17 Claims, 9 Drawing Sheets

PHOTOFINISHING METHOD UTILIZG340104ORDED DATA FOR A PRINTING OPERATION

BACKGROUND OF THE INVENTION

The present invention relates to a method for photofinishing of photographic film, and more particularly to a photofinishing method which uses various recorded data regarding recording of image frames for a printing operation.

When a laboratory receives an order from a customer for processing a 35 mm negative film after exposure, a developed filmstrip is cut into film pieces of a predetermined length, e.g. of six image frames each, inserted in a film sheath, and given back to the customer together with photographic prints printed from this filmstrip.

However, it is inconvenient to handle or preserve film pieces which are cut to a predetermined length, because the film pieces cannot be folded to a smaller length, although the amount of space necessary to contain the filmstrip can be reduced by containing the film pieces in the film sheath. Using film pieces of a predetermined length also is inefficient because an additional process is necessary to insert the film pieces in the film sheath, besides the process of cutting a filmstrip into shorter film pieces of a predetermined length corresponding to the film sheath in the laboratory.

Improved systems have been proposed, including a system for developing the film cassette with the filmstrip being wound in the film cassette thereafter, and a system for separating the filmstrip from the film cassette before development, after which the filmstrip is rewound into the film cassette. The first system is deficient in requiring a rack-and-tank type developing process. The necessary construction for entering the filmstrip into a number of tanks results in low filmstrip processing speed, a massive processing machine, and frequent irregularity in development. The second system includes a motion-picture-film type developing process with elongated negative film spliced into a great number of filmstrips, and thus is not as inconvenient as the first system. However, it would be difficult to reinsert the filmstrip into the film cassette after development if the film cassette is deformed or broken while a user uses the film cassette. It is necessary either to use a more solid film cassette, or to improve a filmstrip reinserting mechanism in the processing machine. As a result, manufacturing the film cassette is more expensive, and the processing machine acquires a massive and complicated structure.

As is known in the art, there are methods for recording data when taking a photograph, such as a date, a time, a shutter speed and an f-number, as disclosed in Japanese Patent Laid-Open Publications Nos. 51-117632, 64-6933, 63-201645, 49-74019, 55-101932, and 54-2115, and Japanese Utility Model Laid-Open Publication No. 63-188644, inter alia. There are methods for recording data, at photograph taking time, regarding illuminating light, as disclosed in Japanese Patent Laid-Open Publications Nos. 51-117632 and 52-30429, inter alia, and methods for recording trimming data, as disclosed in Japanese Patent Laid-Open Publications Nos. 63-298233 and 64-21432, inter alia. There also are known methods for recording characters indicating a user or a kind of subject, as disclosed in Japanese Patent Laid-Open Publications Nos. 50-30517, 55-101932, and 54-2115, inter alia. The image recording data as described herein is recorded on an area of the filmstrip outside the image frames, a data recording portion formed on the peripheral surface of the film cassette, or the like. However, there is a problem in failure to utilize the image recording data sufficiently, because a film cassette is abandoned at developing time with the data recorded on the film cassette.

SUMMARY OF THE INVENTION

In view of the foregoing, it is an object of the present invention to provide a photofinishing system capable of developing photographic film with great efficiency.

It is another object of the present invention to provide a photofinishing system capable of easily handling a developed film after printing.

It is still another object of the present invention to provide a photofinishing system capable of making sufficient use of image recording data stored on the film cassette.

In order to achieve the above and other objects and advantages, the inventive photofinishing system is constituted by the steps of: recording data regarding recording of a plurality of image frames when the filmstrip is exposed to record the image frames on a first data recording portion on a first film cassette containing a photographic filmstrip; separating the filmstrip from the first film cassette before development; splicing a plurality of filmstrips to produce an elongated filmstrip; developing the spliced film; separating the filmstrip from the spliced film after development; inserting the separated filmstrip into a second film cassette; and transferring the image recording data from the first data recording portion on the first film cassette to a second data recording portion formed on the second film cassette.

According to a preferred embodiment of the invention, the image recording data further are recorded on a data recording area formed on the filmstrip when the filmstrip is exposed.

According to another preferred embodiment of this invention, a photofinishing system is constituted by the steps of: recording data regarding recording a plurality of image frames when the filmstrip is exposed to record the image frames on a data recording area on a photographic filmstrip; separating the filmstrip before development from a first film cassette which contains the filmstrip; splicing a plurality of filmstrips to produce an elongated filmstrip; developing the spliced film; separating the filmstrip from the spliced film after development; inserting the separated filmstrip into a second film cassette; and transferring at least a part of the image recording data from the data recording area on the first film cassette to a second data recording portion formed on the second film cassette.

Because the filmstrip is wound up in a film cassette after development and printing, a filmstrip can be preserved in a convenient handling state with ease in accordance with the present invention. The filmstrip can be prevented from capturing dust or being damaged, as it is handled in the film cassette during a developing/printing process or an extra printing process. The filmstrip can be subjected to printing with great ease, as the image recording data transferred to the preservative film cassette enables detection of the state of the whole filmstrip without drawing the entire filmstrip out of the film cassette.

BRIEF DESCRIPTION OF THE DRAWINGS

The foregoing and other objects and advantages of the present invention will become more apparent from the following detailed description when read in connection with the accompanying drawings, in which.

DETAILED DESCRIPTION OF THE PREFERRED EMBODIMENT

Figure 1:
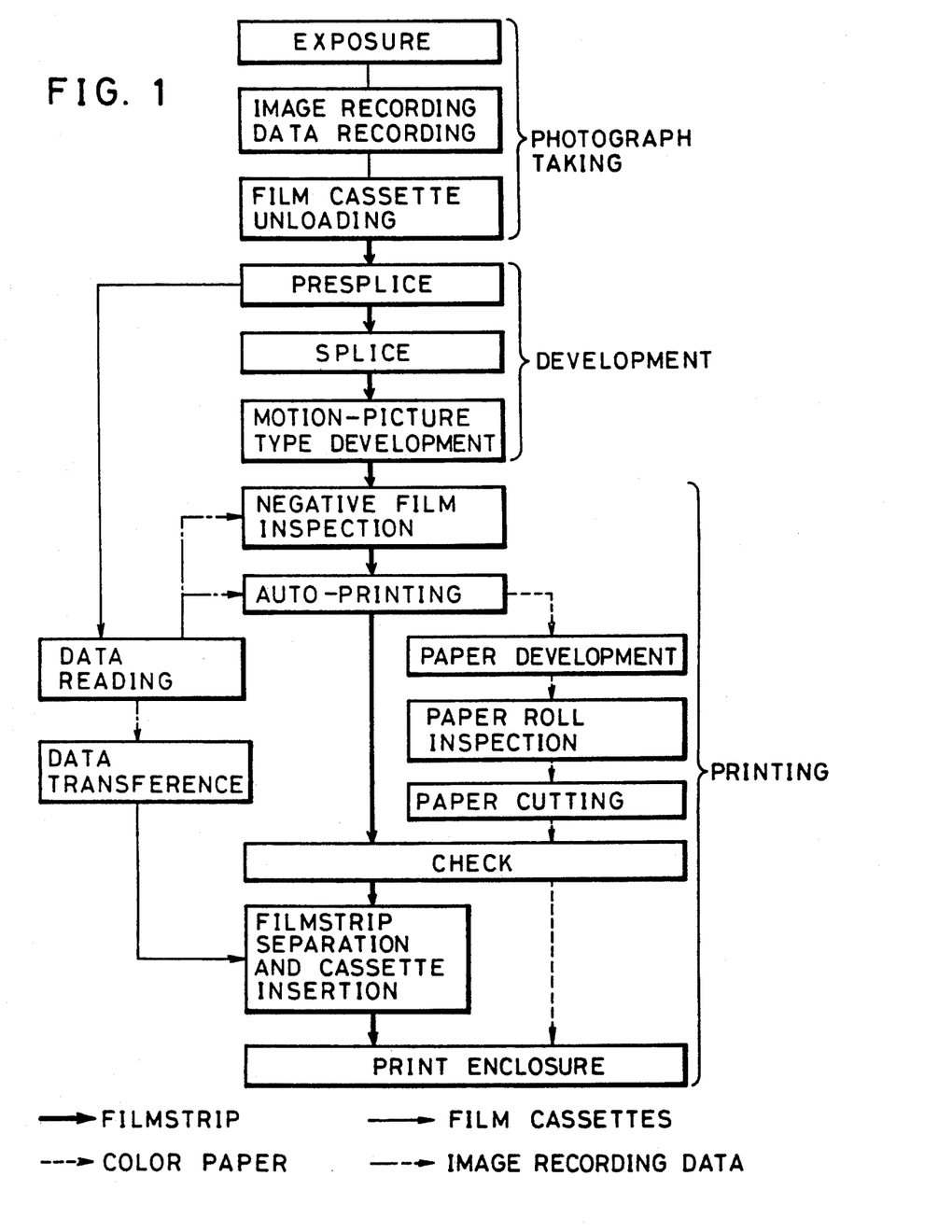
FIG. 1 is a flow diagram showing photofinishing processes in accordance with the present invention.

In FIG. 1, illustrating each of the processes constituting the inventive system, the thick solid line arrows indicate the flow of a strip of negative film. The dotted line arrows indicate the flow of color paper printed from the filmstrip. The fine solid line arrows indicate the flow of film cassettes. The dot-dash-line arrows indicate the flow of image recording data.

In taking a photograph, a camera to be described later records both an image and image recording data. The filmstrip exposed in the camera is unloaded from the camera and is brought to a photofinishing laboratory. A developing process consists of a presplicing step, a splicing step and a motion-picture-film type developing step. In the presplicing step, the leading end of the exposed filmstrip is advanced automatically from inside the film cassette by a well-known auto-presplicer. In the splicing step, the filmstrip, with its leading end advanced outside, is set in a well-known auto-splicer, which draws and separates the whole filmstrip from the film cassette. A plurality of filmstrips thus are spliced to one another to produce an elongated negative film, which is wound into a roll. The elongated negative film then is developed.

The film cassette from which the filmstrip has been removed is subjected to data reading process, in which an image recording data reading device to be described later reads out image recording data stored in a data recording portion of the film cassette. The image recording data are written in an LSI card for image recording data, with an ID (identification) code of each filmstrip as address data. The LSI card is used not only in an inspecting step and an auto-printing step in a printing process, but also in a data transferring process in which the image recording data are transferred to a preservative film cassette which contains the filmstrip after printing.

In the data transferring process, the image recording data are read out of the LSI card and are transferred, via magnetic recording, to a data recording portion of the preservative film cassette. Alternatively, the data recording portion may be adhered detachably to the film cassette for exposure, and detached thereafter for adherence to the preservative film cassette to transfer the image recording data. Instead of writing the image recording data for each filmstrip provisionally in the LSI card, the data also may be sent on line to apparatuses such as photographic printer.

In the film inspecting process, an operator inspects the negative film using a well-known negative film inspecting device. The obtained film inspecting data re recorded in an LSI card for inspecting the negative film by operating a correction key. The image recording data stored on the LSI card data are retrieved and are referred to for the film inspection. It is noted that position data for each image frame may be recorded as well as the film inspecting data. The image frame to be printed can be positioned correctly at the printing stage in the printing process that follows. The position data for this case are obtained according to a film feeding amount and an output from an edge sensor for detecting the position of the edge of each frame. When no edge is detected exactly, other inputs also are used, e.g. a correction value entered from a fine correction key. Although the present embodiment uses an LSI card to record the data, a conventional punched tape also may be used for recording the data.

In the auto-printing step, each image frame is printed on color paper by use of an auto-printer to be described later, through which the film inspecting data and the image recording data are referred to in the LSI cards. Instead of using the two LSI cards each for the film inspection and image recording data, a single LSI card may be used for both.

The color paper which has been exposed for printing is developed in a paper developing step. Then, in a paper roll inspecting step, it is judged whether each point is defective. Defective prints are marked with no good (NG) marks. The exposed color paper is cut frame by frame in a paper cutting step. In the paper roll inspecting step, the frames with NG marks are thrown away. In a checking step, the finished prints are inspected to see whether they correspond to each of the image frames on the filmstrip. The elongated negative film is cut into initial filmstrips at the portions spliced by splice tape. Each filmstrip is inserted in the preservative film cassette with the image recording data transferred thereto, the film being wound up and contained in the cassette.

The filmstrip wound in the preservative film cassette then is enclosed in an envelope with printed photographs in a print enclosing step, and is supplied to a customer.

A camera to be used in the photograph taking process now will be described with reference to FIG. 2. Upon operating a shutter release button 10, a shutter 12 opens by means of a controller 11. The image of a principal subject is recorded on a filmstrip 14 of negative film through a taking lens 13. As is well-known in the art, an auto-exposure (AE) mechanism 15 is operated to determine the f-number of diaphragm 16 and the shutter speed to be inputted in the controller 11 so as to effect exposure at an optimum value based on subject brightness. The controller 11 adjusts the diaphragm 16 and the shutter 12 accordingly. As also is well-known, an autofocus (AF) mechanism 17 is operated to focus the taking lens 13.

A brightness signal from the AE mechanism 15 and a subject distance signal from the AF mechanism 17 are entered in a signal generator 18, which also is connected to input keys 19 for inputting various data and to an auto-date mechanism 20. Based on the data received from the various mechanisms, the signal generator 18 encodes the received data and sends them to a magnetic recording mechanism 21. The magnetic recording mechanism 21 causes a magnetic recording head 21A to scan two-dimensionally to record the encoded signals magnetically on a data recording portion 23 of a film cassette 22.

The operation of the input keys 19 enables input of image recording data such as zooming magnification, length-to-width ratio, and specified size of the principal subject. Methods for inputting various image recording data, for recording them on photographic film, and for treating them in a printing process are described in detail in the documents as referred to above and also in a plurality of Japanese applications filed by the same applicant. Such methods now will be summarized.

To use zooming magnification data, a photograph is taken with a taking lens at a fixed magnification and a changed zooming magnification of a viewfinder in the camera. The magnification of the viewfinder is recorded at the changed value. To make a print from a frame with the zooming magnification data, trimming magnification is determined by the recorded data. The zooming magnification to be recorded may be variable continuously, or stepwise in some number of steps.

To use length-to-width ratio data, a photograph is taken with a fixed field and a changed length-to-width ratio of an image frame of the viewfinder in the camera. The length-to-width ratio is recorded at the changed value. To make a print from a frame with the length-to-width ratio data, a trimming range is determined based on the recorded data.

To use principal subject size data, the size of a principal subject, e.g. a person, is specified so as to correspond to a particular size on a print. To make a print from an image frame with the subject size data, a trimming magnification is determined from the recording data. It is noted that, if a plurality of successive image frames are recorded, the subject size data are specified only at the first image frame of a filmstrip, with the other frames provided with data based on that of the first image frame. This construction makes it possible to make a series of prints with different principal subjects printed in the same size.

An image recording data reading device to be used in the data reading process now will be described with reference to FIG. 3. The film cassette 22 from which an exposed filmstrip is removed is held in the data reading device. A magnetic playback head 24A is caused to scan two-dimensionally on the data recording portion 23 by a head driver 25. A magnetic reader 24 amplifies a weak signal from the playback head 24A, converts it to the image recording data, and sends it to an LSI card writer 26 to write the image recording data in an LSI card 27. A controller 28 controls sections of the data reading device. The controller 28 is supplied with data from a keyboard 28A. Data such as a new ID code can be recorded additionally in the LSI card 27 through the keyboard 28A.

Figure 4:
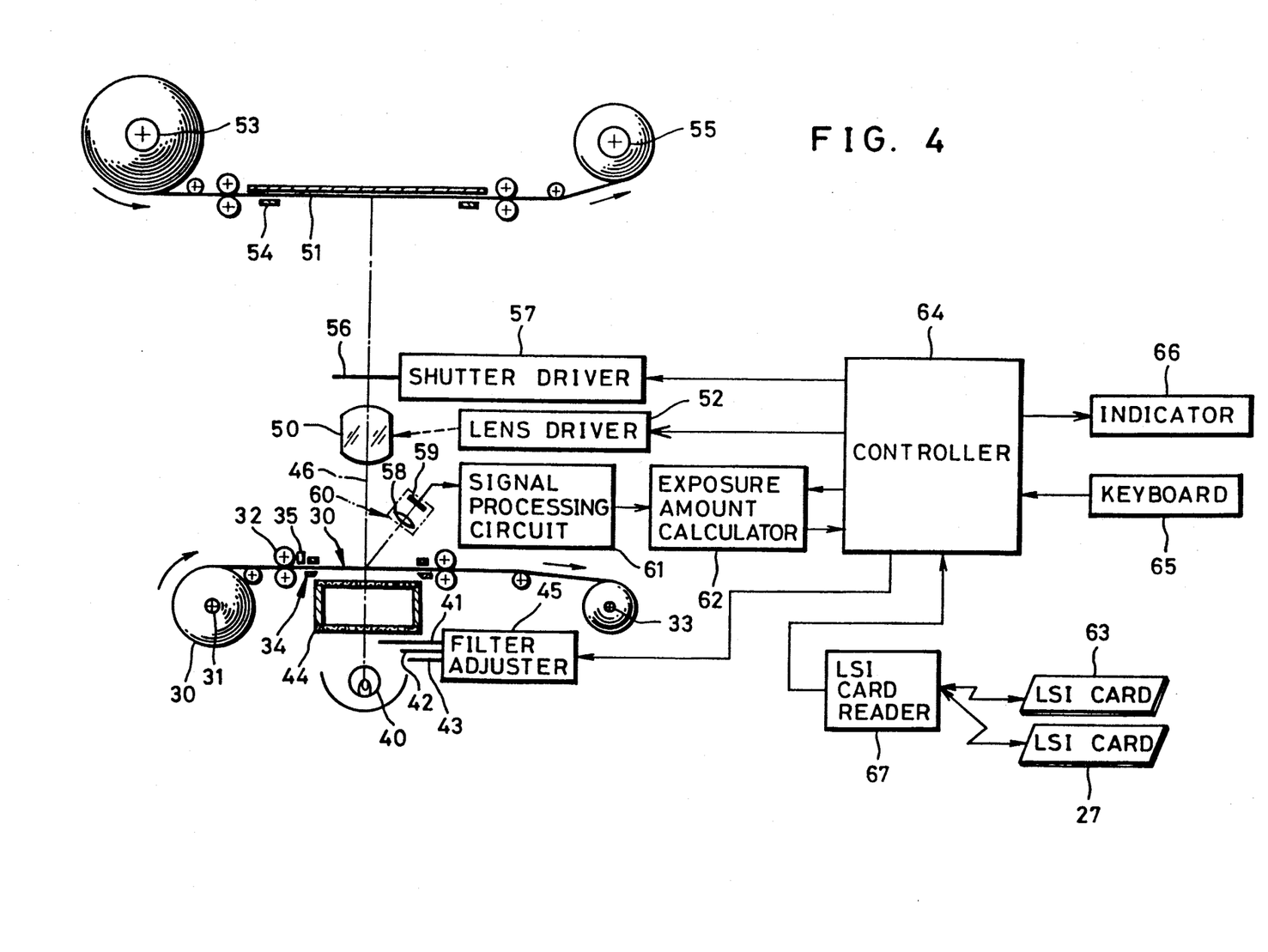
FIG. 4 is a schematic diagram showing a photographic printer used in the photofinishing system of FIG. 1.

A printer to be used in the printing process now will be described with reference to FIG. 4. After splicing exposed filmstrips wound in a roll, the resulting elongated negative film 30 is attached to a flange-fitted shaft 31, fed to a film holder 34 through a pair of feeding rollers 32, and wound around a flange-fitted shaft 33. In feeding the elongated negative film 30, a leading edge of each image frame recorded on the negative film 30 is detected by an edge sensor 35. Each frame is set at a printing stage in accordance with a detection signal. White light emanated from a light source 40 enters a mixing box 44 through three color correction filters 41, 42, and 43, i.e. cyan, magenta, and yellow. A filter adjuster 45 controls the color filters 41 to 43 as to their degree of insertion into a printing optical path 46 so as to adjust the printing light as to the three color components and the intensity. The mixing box 44 is constituted by an open ended square box-shaped tube with mirrored inside walls and diffusion plates attached to the top and bottom of the box-shaped tube. The light diffused through the mixing box 44 illuminates each frame on the elongated negative film 30 held on the film holder 34.

A printing lens 50 consisting of a zoom lens is disposed above the printing stage to focus an image of each image frame on the negative film 30 onto color paper 51 fed from a flange-fitted shaft 53 to a flange-fitted shaft 55. The printing magnification of the printing lens is changeable through a lens driver 52. A reference numeral 54 designates a paper mask. A shutter 56 is arranged between the printing lens 50 and the color paper 51 so as to retract from the printing optical path 46 for a predetermined period through a shutter driver 57.

A scanner 60, disposed above and downstream from the printing stage, consists of a lens 58 and an image area sensor 59 for measuring light transmitted at each point in an image frame set at the printing stage. A signal from the scanner 60 is sent to a signal processing circuit 61, and is converted logarithmically and digitally therein. A density signal which is obtained of each point is sent to an exposure amount calculator 62, which calculates an optimum exposure amount by use of an exposure amount calculating equation on the basis of such data as the density signal, data stored in the LSI card 27, and data stored in an LSI card 63 supplied with exposure correction data at the film inspecting step. The calculated optimum exposure amount is entered in a controller 64.

A controller 64, constituted by a well-known microcomputer, is connected to a keyboard 65 for selecting control modes, inputting various data and effecting the whole control of the printer, an indicator 66 for indicating the data and the modes, and an LSI card reader 67. The controller 64 causes the LSI card reader 67 to read the data in the LSI cards 27 and 63, and sends the data to the exposure amount calculator 62. The controller 64 further calculates a filter setting position based on the relationship between the exposure amount from the exposure amount calculator 62 and the initial position of the color filters 41 to 43. The obtained filter setting position is entered into a filter adjuster 45 to adjust the quality of light and to control the shutter 56 through the shutter driver 57. When image recording data such as a trimming magnification are received, the controller 64 changes the magnification of printing lens 50 through the lens driver 52. Image frames on the negative film 30 are printed successively on the color paper 51, being exposed on the basis of the film inspecting data and image recording data. The exposed color paper 51 is wound onto the flange-fitted shaft 55.

Figure 5:
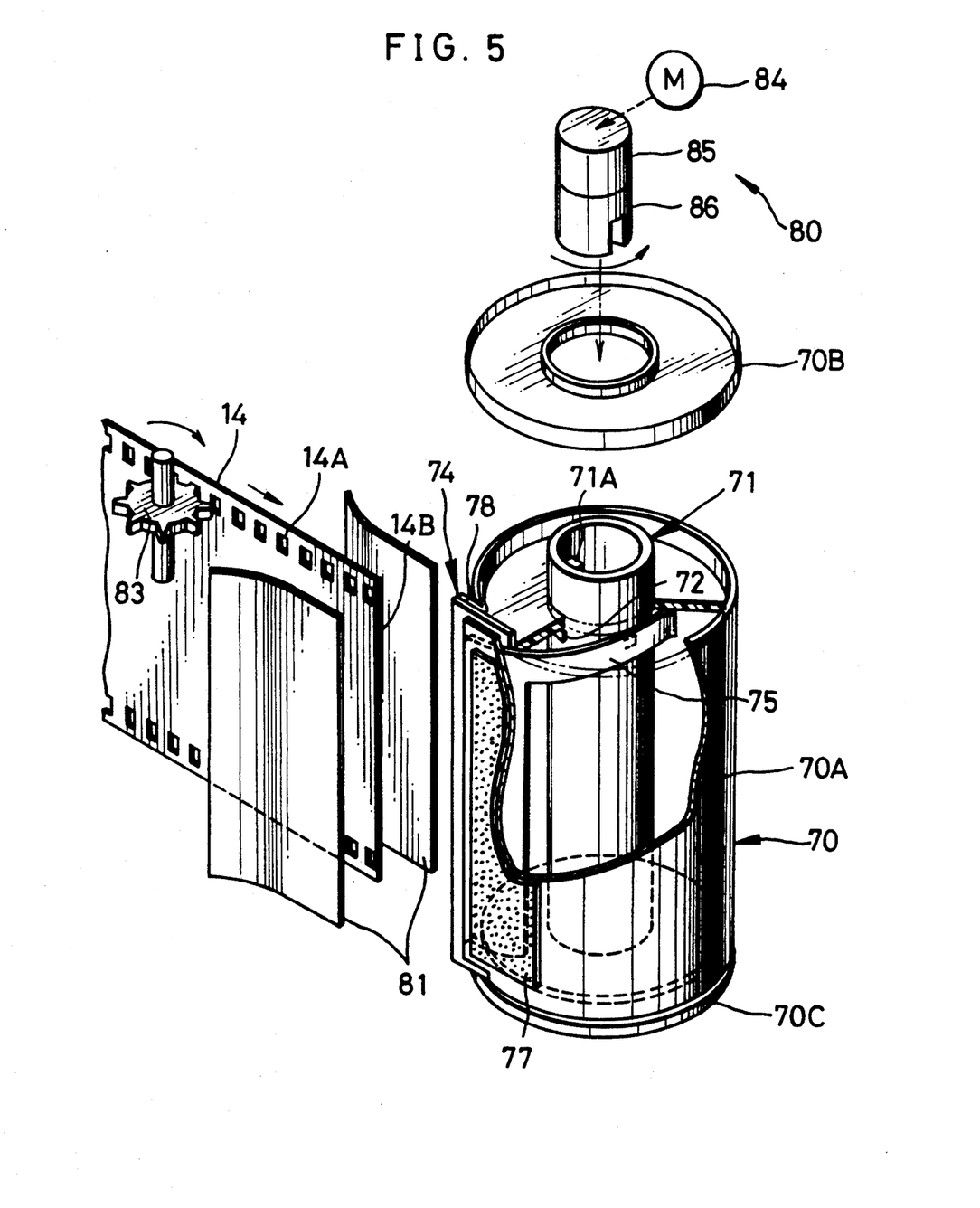
FIG. 5 is an exploded perspective view showing a process for inserting a filmstrip into a preservative film cassette after a printing process in the printer shown in FIG. 4.
Figure 6:
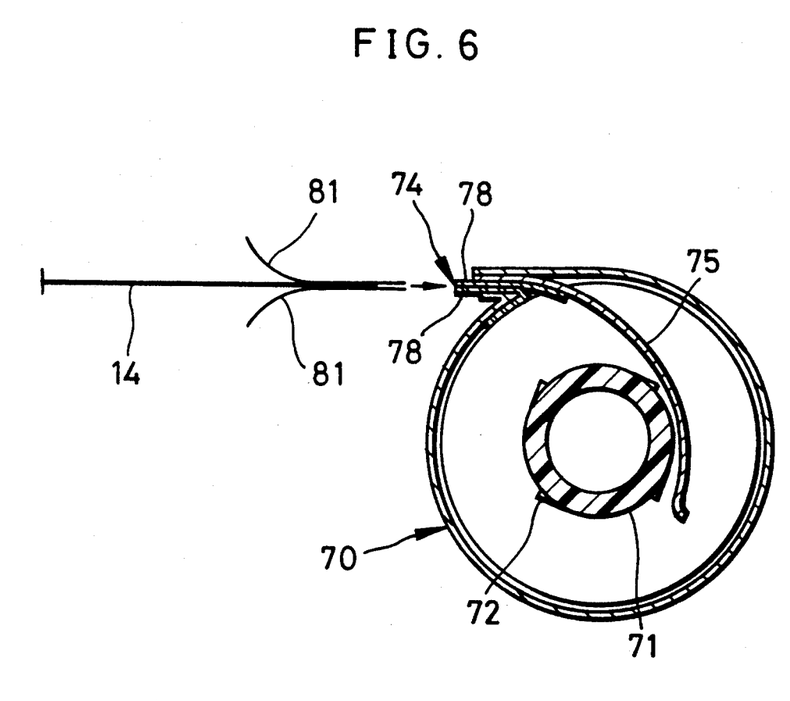
FIG. 6 is a sectional view of FIG. 5.

Referring now to FIGS. 5 and 6, a construction of a preservative film cassette 70 into which the separate filmstrip 14 can be wound up will be described. The film cassette 70 differs from conventional types in that a spool 71 is formed with capture members or a ratchet 72 at its periphery to engage perforations 14A of the filmstrip 14. Another difference is that an elastic guide plate 75 is provided for guiding a first film end 14B of the filmstrip 14 from a film passage mouth 74 of the film cassette 70 to the capture members 72. Also, a data recording portion 77 is formed on the peripheral surface of a cassette body 70A.

The guide plate 75, which may be made of plastic and/or metal, presses the first film end 14B against the spool 71 by means of the elastic force of the guide plate 75. In this way, the perforations 14A are engaged reliably with the capture members 72. The filmstrip 14 thus is wound on the spool 71 by rotating the spool 71. The guide plate 75 is formed with an end portion that is narrower close to the spool 71 so that it presses the filmstrip 14 only at the edge portion having perforations 14A, so as not to damage the film surface having image frames. Instead of the elastic guide plate 75, a guide plate urged by a coil spring, spring plate or the like may be applicable. Cassette caps 70B and 70C are fitted on both openings at the ends of the film cassette 70. Although the film cassette 70 is formed cylindrically herein, instead it may be formed as a rectangular prism or a polygonal prism.

When winding up the developed filmstrip 14 into the film cassette 70, the first film end 14B of the filmstrip 14 is held between a pair of guide members 81 and is inserted, along with the guide members 81, into the film passage mouth 74. Thereafter the guide members 81 are loosened to allow the filmstrip 14 to enter further into the film cassette 70, while the filmstrip 14 is fed by means of rotary force of a sprocket 83 engaging the perforations 14A. When the first film end 14B reaches the peripheral surface of the spool 71 by means of the guide plate 75, the perforation 14A then is engaged with the ratchet 72, so that the filmstrip 14 thereafter is wound up into the film cassette 70 by rotating the spool 71.

A wind-up device 80 is constituted by a motor 84 and a fork 86 mounted on the shaft of the motor 84 through a friction clutch 85. The fork 86 is brought into engagement with an engaging member 71A formed in the end portion of the spool 71, so as to rotate the spool 71. When the elongated negative film is wound completely onto the spool 71 up to a length corresponding to one filmstrip 14, a portion spliced by splice tape is detected, where the elongated negative film is cut into filmstrips 14 which are wound up in the film cassette 70. A winding-up operation is completed with the second film end (not shown) of the filmstrip 14 protruding slightly from the film passage mouth 74 of the film cassette 70.

In order to use the film cassette 70 in practice, because the filmstrip 14 is engaged only at the first film end 14B in the capture members 72 of the spool 71, the first film end 14B would slip out from the film cassette 70 if the filmstrip 14 were to continue to be fed after all the frames are drawn at the extra printing time. After slipping out of the film cassette 70, the filmstrip 14 would not be inserted easily in the film cassette 70 after extra printing. To prevent the separation of the filmstrip 14 from the film cassette 70, it is preferable to provide an end mark, such as a hole, near the first film end 14B for indicating the first film end 14B, and to detect the end mark by a sensor such as an optical sensor disposed in the printer, so as to stop advancing the filmstrip 14 from the film cassette 70 in response to a sensor signal.

Figure 7:
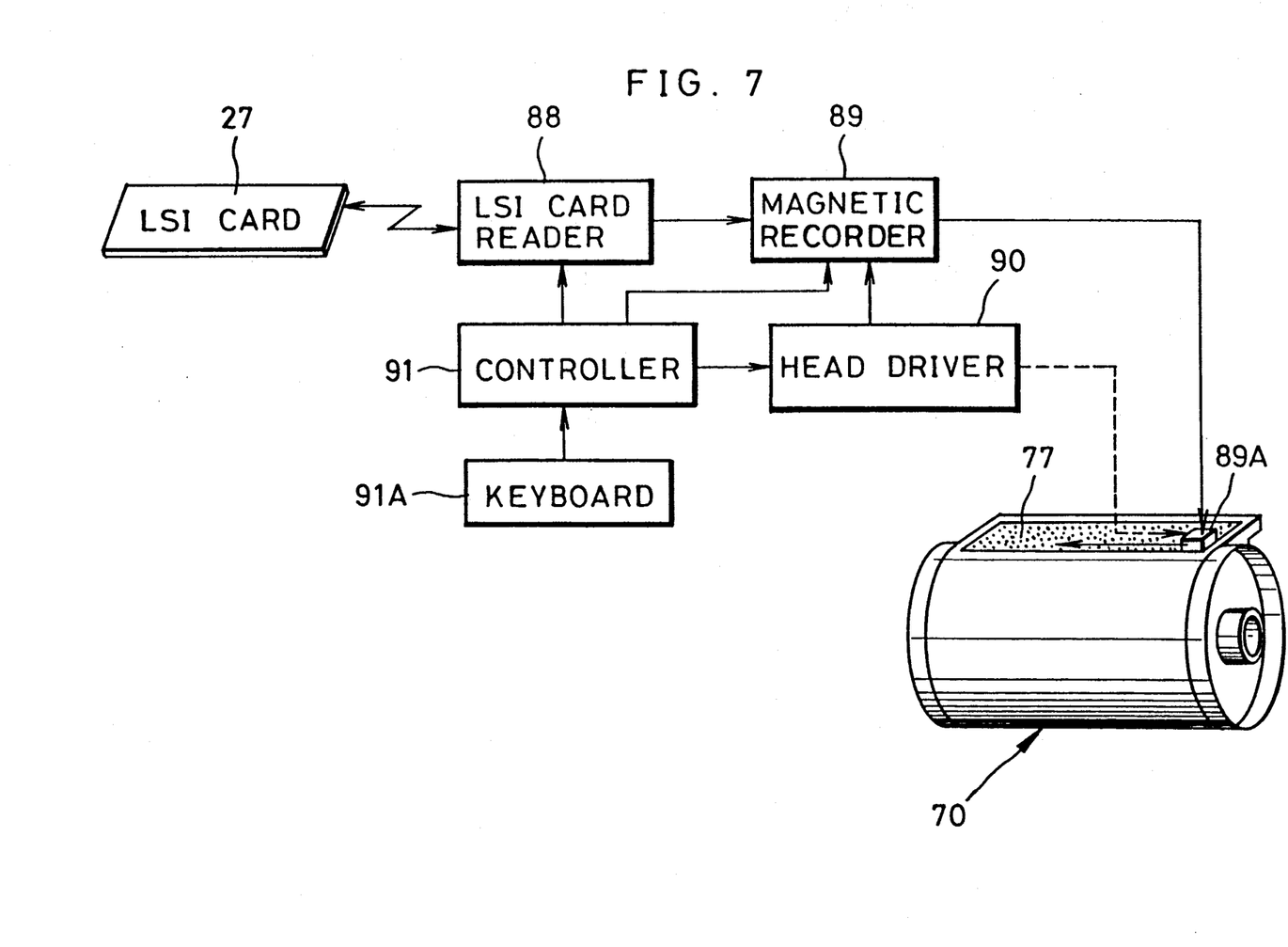
FIG. 7 is a schematic diagram showing a data recording device for recording image recording data on a data recording portion of the film cassette shown in FIGS. 5 and 6.

An image recording data recording device to be used in the data transferring process now will be described with reference to FIG. 7. When the LSI card 27 for image recording data is set at an LSI card reader 88, the LSI card reader 88 reads out the image recording data and sends them to a magnetic recorder 89, which converts the data into a magnetic recording signal and drives a magnetic recording head 89A accordingly. A head driver 90 causes the recording head 89A to scan the data recording portion 77 two-dimensionally. The head 89A records the image recording data on the data recording portion 77 accordingly. A controller 91, which controls sections of the data recording device, is supplied with data from a keyboard 91A. Data such as a customer ID code also can be recorded in the data recording portion 77.

Although the present embodiment is constructed so that the data recording portion 23 of the initial film cassette 22 is used to record the image recording data in the camera, instead the camera may record data as to each individual image frame onto th filmstrip outside image frames, and also may record data onto the data recording portion of the preservative film cassette which is common to the image frames on the whole filmstrip. In this case, only the data stored in the data recording portion of the initial film cassette are transferred to the data recording portion on the preservative film cassette. Further, all the image recording data may be recorded onto the filmstrip outside the image frames. In this case, only the common data as to the whole filmstrip are transferred to the data recording portion of the preservative film cassette so as to obtain conveniently the data common to the image frames without reading the data recorded on the filmstrip upon printing.

Image recording data may be recorded optically on the negative film. Alternatively, a magnetic recording layer may be formed on an edge of the negative film where data are to be recorded magnetically.

Figure 2:
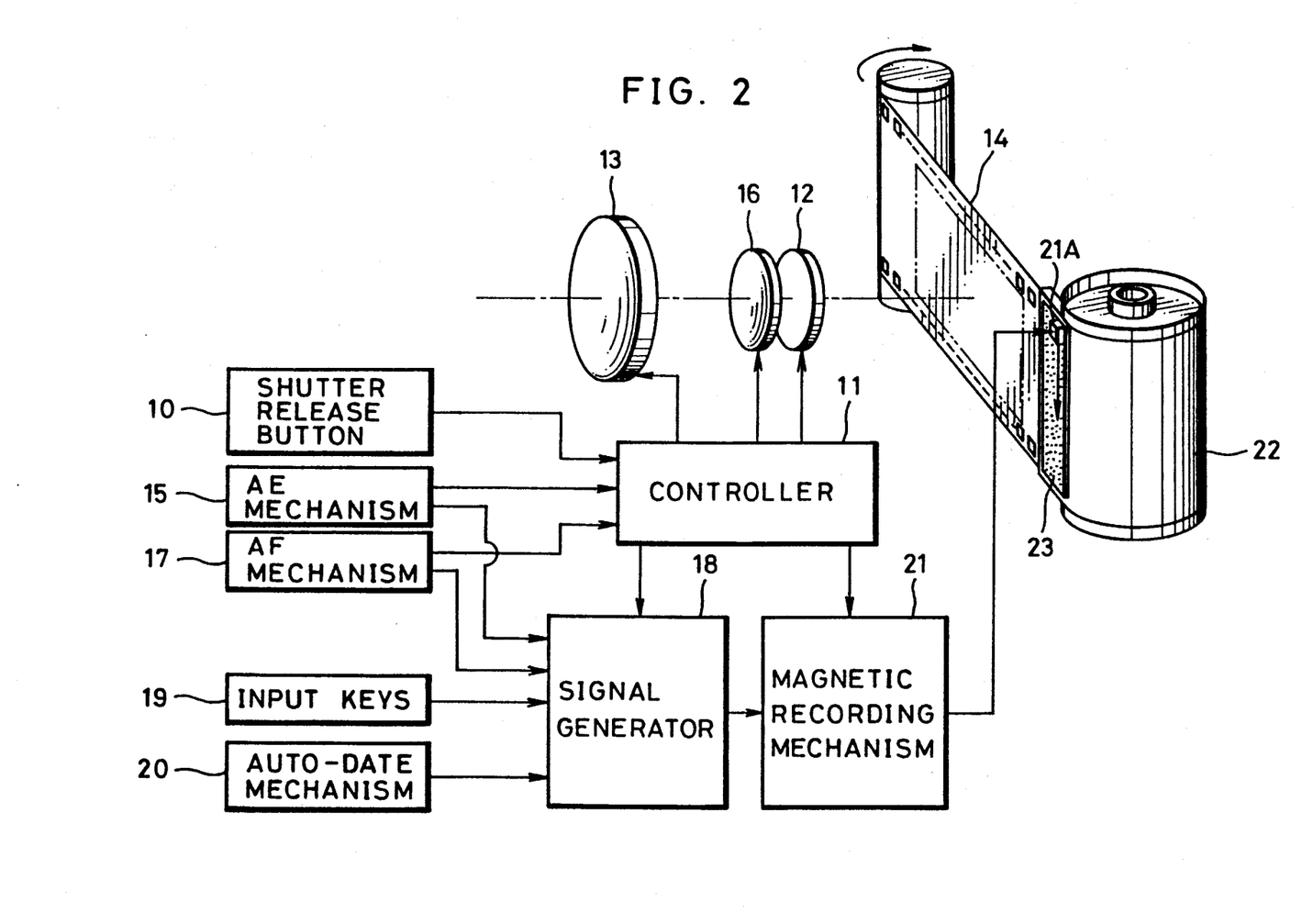
FIG. 2 is a schematic diagram showing a camera used in the photofinishing system shown in FIG. 1.
Figure 8:
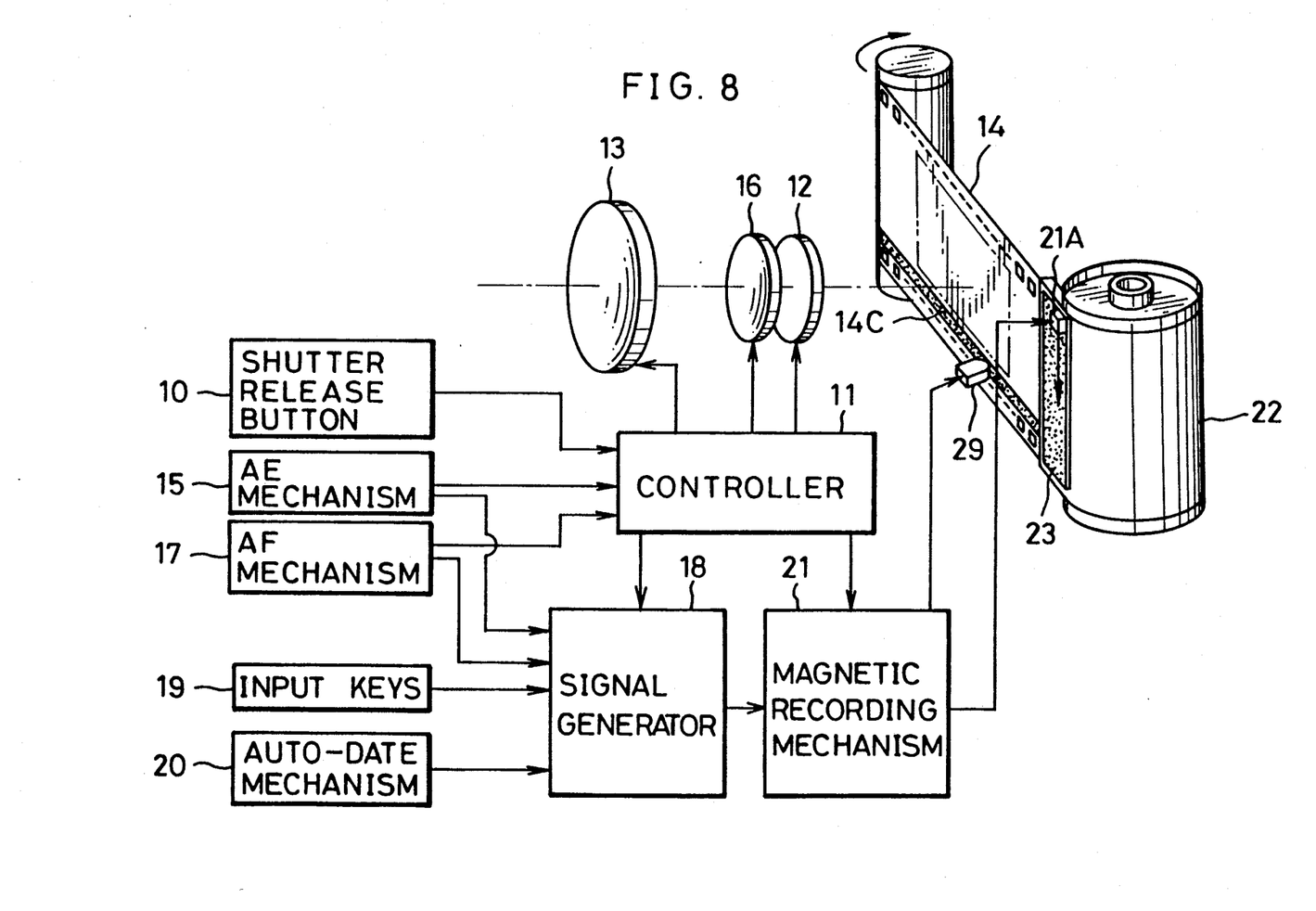
FIG. 8 is a schematic diagram similar to FIG. 2 and shows an embodiment for recording image recording data onto a filmstrip.

More specifically, FIG. 8 is a diagram similar to FIG. 2 and illustrates an embodiment for recording image recording data onto the filmstrip. The filmstrip 14 in FIG. 8 is provided with a magnetic recording layer 14C arranged on its one longitudinal edge. A magnetic recording head 29 is in contact with the magnetic layer 14C. The image recording data, such as data regarding exposure of each frame, are recorded onto the magnetic layer 14C.

Figure 3:
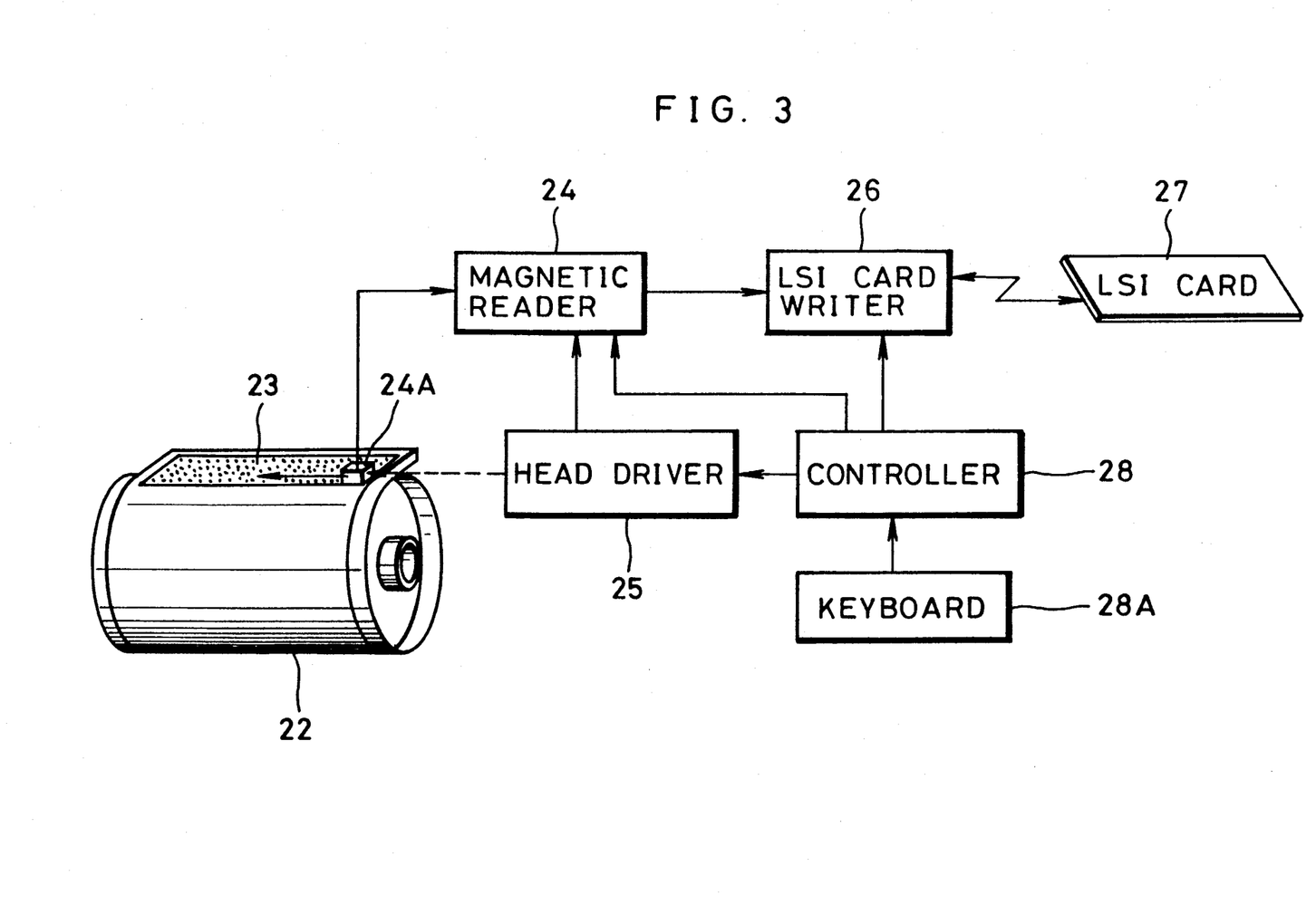
FIG. 3 is a schematic diagram showing an image recording data reading device used in the photofinishing system shown in FIG. 1.
Figure 9:
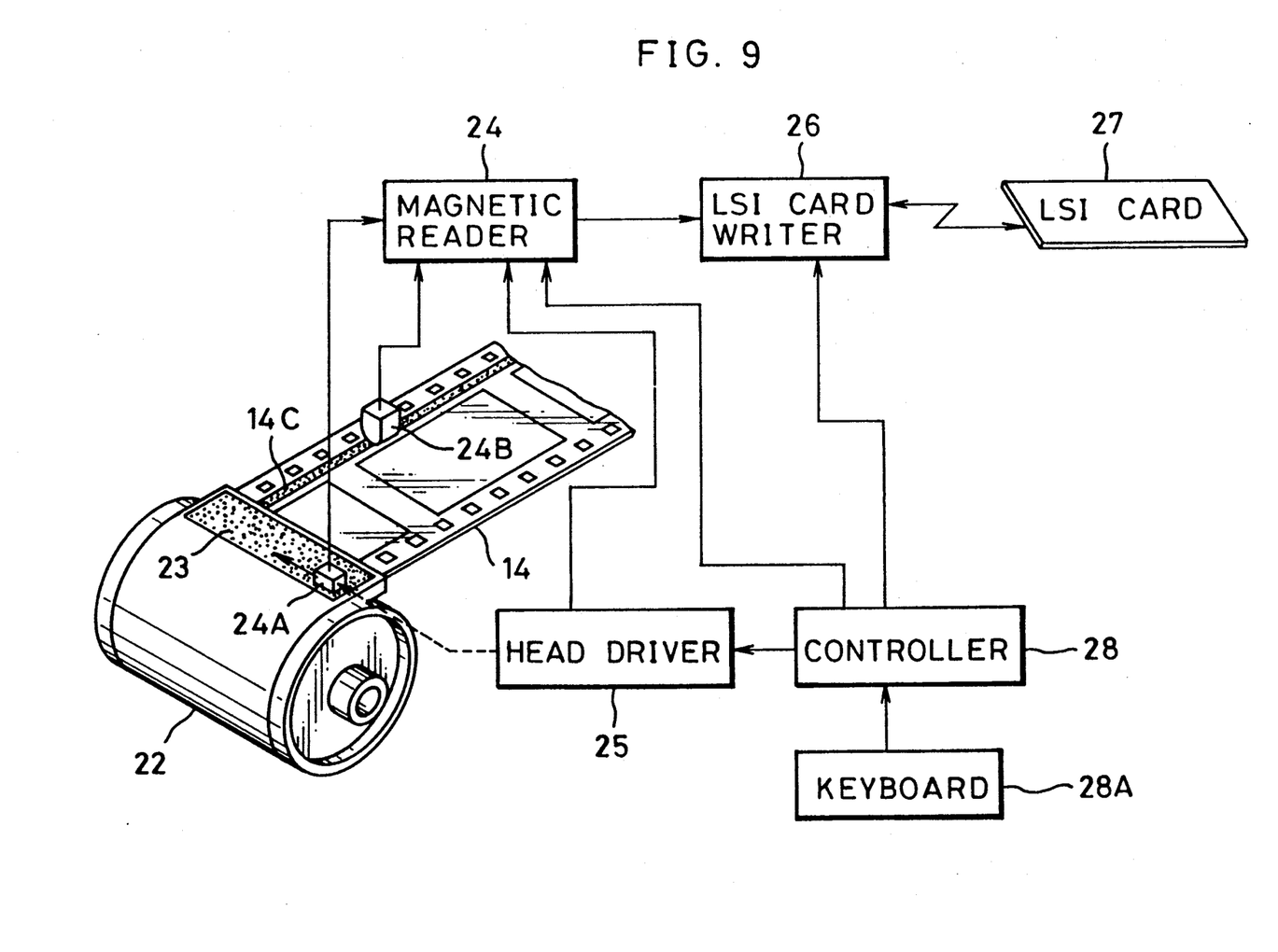
FIG. 9 is a schematic diagram similar to FIG. 3 and shows a magnetic head for reading image recording data.

FIG. 9 is a diagram similar to FIG. 3. The magnetic head 24B reads the image recording data out of the magnetic layer 14C, and sends the data to the magnetic reader 24. If all the image recording data are written into the magnetic layer 14C, the reading head 24A can be omitted.

The camera may be provided with a memory for storing recording data provisionally in order to complete all exposures of the filmstrip before recording all the image recording data at once in the data recording portion. It is preferable in this case to form a magnetic or an optical recording area at the leading end or the trailing end of the filmstrip.

Although in the above embodiment image recording data consist of a date, a shutter speed and a trimming magnification, they also may include data identifying the owner or user of the camera. The user data can be utilized for reference to customers in a laboratory or an agency for a laboratory. If finished prints are delivered directly to customers from an agency or laboratory, the user data can be used for specifying an addressee. For this purpose, a mechanism is provided in the camera for automatically recording the initially stored user data even on an exchanged filmstrip. Specifically, data such as user data are written beforehand in a memory for identification by use of ID code input keys, and are recorded upon loading a filmstrip in the camera or recording other data. Further, it is possible that the user data may be changed at the time of exchange or exposure of the filmstrip. It is noted that, when an ID code is used for data such as user data, the ID code can be used as a secret code for a printing order through an automatic photofinishing machine or an automatic photofinishing accepting machine.

Image recording data also may include light source data, a title for the filmstrip, free commentary, and audio data. In order to record light source data, the camera is provided with a spectral light receiver to record color data of the light source onto the filmstrip upon taking a photograph. The light source data are used for exposure control in printing. Although in the above embodiment the film cassettes are provided with data recording portions for magnetic recording, they may be provided instead with data recording portions of IC memory.

Although the present invention has been fully described by way of the preferred embodiment thereof with reference to the accompanying drawings, various changes and modifications will be apparent to those having skill in this field. Therefore, unless otherwise these changes and modifications fall outside the scope of the present invention, they should be construed as being included therein.

What is claimed is:

1. A photofinishing method comprising the following steps:
    recording data on a first data recording portion formed on a first film cassette for containing a photographic filmstrip, said data being indicative of recording a plurality of image frames when said filmstrip is exposed to record said image frames;
    separating said filmstrip from said first film cassette before development;
    repeating said recording and separating steps for a plurality of filmstrips;
    splicing said plurality of filmstrips together to produce an elongated filmstrip;
    developing said elongated filmstrip;
    separating said elongated filmstrip into said plurality of filmstrips after said developing step;
    inserting each of said plurality of filmstrips into a respective second film cassette after said developing step; and
    for each of said plurality of filmstrips, transferring said image recording data from said first date recording portion to a second data recording portion formed on said respective second film cassette.

2. A photofinishing system as defined in claim 1, wherein said data transferring step includes:
    reading out said image recording data from said first data recording portion, and
    recording said read-out image recording data on to said each said second data recording portion.

3. A photofinishing system as defined in claim 2, wherein said elongated filmstrip is used for making prints before separating said plurality of filmstrips from said spliced film.

4. A photofinishing system as defined in claim 3, wherein said read-out image recording data are used as reference in inspecting said filmstrip before making said prints, and for making said prints in addition to inspection data obtained in inspecting said filmstrip.

5. A photofinishing system as defined in claim 1, wherein said recording and transferring steps comprise recording magnetic data onto said first and second data recording portions.

6. A photofinishing system as defined in claim 5, wherein said image recording data are recorded by a camera for recording said image frames onto said filmstrip.

7. A photofinishing system as defined in claim 2, wherein said image recording data are read out by a data reading device from said first data recording portion.

8. A photofinishing system as defined in claim 2, wherein said image recording data read out from said first data recording portion are written in an LSI card, and are read out from said LSI card in order to be recorded onto said second data recording portion.

9. A photofinishing system as defined in claim 2, wherein said image recording data are recorded by a data recording device onto said second data recording portion.

10. A photofinishing system as defined in claim 1, wherein, for each of said plurality of filmstrips, said image recording data are further recorded onto a data recording area formed on said each of said plurality of filmstrips upon exposure.

11. A photofinishing system as defined in claim 10, wherein image recording data common to all said image frames on each of said plurality of filmstrips are recorded onto said first data recording portion, and image recording data specific to said respective image frames are recorded onto said data recording area.

12. A photofinishing system as defined in claim 10, wherein said recording steps comprise recording magnetic data onto said first and second recording portions.

13. A photofinishing method comprising the following steps:
    recording data regarding recording of a plurality of image frames when said filmstrip is exposed to record said image frames onto a data recording area formed on a photographic filmstrip;
    separating said filmstrip before development from a first film cassette containing said filmstrip;
    repeating said recording and separating steps for a plurality of filmstrips;
    splicing said plurality of filmstrips to produce an elongated filmstrip;
    developing said elongated filmstrip;
    separating said elongated filmstrip into said plurality of filmstrips after said development;
    inserting each of said plurality of filmstrips into a respective second film cassette; and
    for each of said plurality of filmstrips, transferring at least a part of said image recording data from said data recording area to a second data recording portion formed on said respective second film cassette.

14. A photofinishing system as defined in claim 1, wherein said part of said image recording data are data common to all said image frames on said filmstrips.

15. A photofinishing system as defined in claim 1, transferring step comprises recording data magnetically onto said second data recording portion.

16. A photofinishing method comprising the following steps:
- recording data regarding recording of a plurality of image frames, when said filmstrip is exposed to record said image frames, onto a first data recording portion formed on a first film cassette for containing a photographic filmstrip, and onto a data recording area formed on said filmstrip;
- separating said filmstrip from said first film cassette before development;
- repeating said recording and separating steps for a plurality of filmstrips;
- splicing said plurality of filmstrips together to produce an elongated filmstrip;
- developing said elongated filmstrip;
- separating said elongated filmstrip into said plurality of filmstrips after said developing step;
- inserting each of said plurality of filmstrips into a respective second film cassette; and
- for each of said plurality of filmstrips, transferring said image recording data at least from said first data recording portion to a second data recording portion formed on said respective second film cassette.

17. A photofinishing system as defined in claim 16, wherein image recording data common to all said image frames on each of said plurality of filmstrips are recorded onto said first data recording portion, and image recording data specific to said respective image frames are recorded onto said data recording area.

* * * * *